United States Patent
Jiang et al.

(10) Patent No.: US 10,331,879 B1
(45) Date of Patent: Jun. 25, 2019

(54) SYSTEMS AND METHODS FOR AUTOMATICALLY GENERATING PASSWORDS THAT COMPLY WITH PASSWORD RESTRICTIONS

(71) Applicant: Symantec Corporation, Mountain View, CA (US)

(72) Inventors: Kevin Jiang, Waltham, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/853,029

(22) Filed: Sep. 14, 2015

(51) Int. Cl.
*G06F 21/46* (2013.01)
*H04L 29/06* (2006.01)

(52) U.S. Cl.
CPC ............ *G06F 21/46* (2013.01); *H04L 63/083* (2013.01)

(58) Field of Classification Search
CPC ............................... G06F 21/46; H04L 63/083
See application file for complete search history.

(56) References Cited

U.S. PATENT DOCUMENTS

| | | | | |
|---|---|---|---|---|
| 6,643,784 B1* | 11/2003 | McCulligh | ............ | H04L 63/083 704/10 |
| 9,626,506 B1* | 4/2017 | Shetty | ...................... | G06F 21/46 |
| 2003/0041251 A1* | 2/2003 | Kumhyr | ................... | G06F 21/31 713/184 |
| 2005/0071645 A1* | 3/2005 | Girouard | ................. | G06F 21/31 713/183 |
| 2006/0026439 A1* | 2/2006 | Moseley | ................. | G06F 21/46 713/184 |
| 2011/0126289 A1* | 5/2011 | Yue | ........................ | G06F 21/554 726/26 |
| 2013/0086655 A1* | 4/2013 | Karp | ....................... | G06F 21/45 726/6 |
| 2013/0347116 A1* | 12/2013 | Flores | ................. | H04L 63/1433 726/25 |
| 2014/0289870 A1* | 9/2014 | Selander | ................ | G06F 21/46 726/28 |

(Continued)

OTHER PUBLICATIONS

Gowtham et al., A secured trust creation in VANET environment using random password generator, 2012 International Conference on Computing, Electronics and Electrical Technologies (ICCEET), 2012, pp. 781-784 (Year: 2012).*

(Continued)

*Primary Examiner* — Luu T Pham
*Assistant Examiner* — Harvey I Cohen
(74) *Attorney, Agent, or Firm* — FisherBroyles, LLP

(57) ABSTRACT

A computer-implemented method for automatically generating passwords that comply with password restrictions may include (1) maintaining a database that stores password criteria for a plurality of websites, (2) determining that a user is accessing a website that requests creation of a password, (3) determining a set of password complexity rules for the website by querying the database that stores the password criteria, (4) using the set of password complexity rules to automatically generate the password for the website such that the password complies with the password criteria for the website, and (5) providing the password for use in the website that requested creation of the password. Various other methods, systems, and computer-readable media are also disclosed.

17 Claims, 7 Drawing Sheets

(56) References Cited

U.S. PATENT DOCUMENTS

2015/0319185 A1* 11/2015 Kirti .................. H04L 63/1416
726/23

OTHER PUBLICATIONS

Modi et al., Keystroke Dynamics Verification Using a Spontaneously Generated Password, Proceedings 40th Annual 2006 International Carnahan Conference on Security Technology, 2006, pp. 116-121 (Year: 2006).*

* cited by examiner

SYSTEMS AND METHODS FOR AUTOMATICALLY GENERATING PASSWORDS THAT COMPLY WITH PASSWORD RESTRICTIONS

BACKGROUND

Password manager software provides users with an easy way of managing complex passwords for multiple websites. Some password managers may also automatically generate these passwords in order to create randomized strings that are difficult to guess. Traditionally, users can customize the passwords that are generated by such software. For example, users may want to limit the size and complexity of a generated password so that it is not too difficult to remember without using the password manager but still difficult enough to provide adequate security. Conversely, users may want longer, more complex passwords to ensure better security.

However, each website may have different password requirements that users must follow. For example, one website may require a mixture of letters, numbers, and symbols while another website may prohibit the use of symbols and special characters. Some websites may also specify minimum and maximum lengths for passwords. In addition, over time, a website's password requirements may change, and generated passwords may no longer satisfy those requirements. Because of changes in requirements and the complexity of different rules, traditional password managers may not be able to generate appropriate passwords that comply with the variety of password criteria for multiple websites. Accordingly, the instant disclosure identifies and addresses a need for additional and improved systems and methods for automatically generating passwords.

SUMMARY

As will be described in greater detail below, the instant disclosure describes various systems and methods for automatically generating passwords that comply with password restrictions by storing and updating website requirements for password generation in a database. Additionally, the disclosed systems may utilize a web crawler to automatically populate the database of password requirements. Furthermore, this system may query the database for a set of password complexity rules prior to generating a password that complies with a website's requirements. When a generated password fails a website's requirements, the disclosed system may update the database based on the failure.

In one example, a computer-implemented method for automatically generating passwords that comply with password restrictions may include (1) maintaining a database that stores password criteria for a plurality of websites, (2) determining that a user is accessing a website that requests creation of a password, (3) determining a set of password complexity rules for the website by querying the database that stores the password criteria, (4) using the set of password complexity rules to automatically generate the password for the website such that the password complies with the password criteria for the website, and (5) providing the password for use in the website that requested creation of the password.

In some examples, maintaining the database that stores the password criteria may include using a web crawler to automatically detect password criteria for each website in the plurality of websites. In these examples, using the web crawler to automatically detect the password criteria for each website in the plurality of websites may include detecting password complexity text and/or parsing the password complexity text to transform the password complexity text into the password criteria. Additionally or alternatively, in some embodiments, using the web crawler to automatically detect the password criteria for each website in the plurality of websites may include identifying a failed attempt to create a new password on a website in the plurality of websites and/or deducing, based on the failed attempt to create the new password, at least one password criterion for the website. Furthermore, in these embodiments, identifying the failed attempt to create the new password may include detecting a failed user attempt to create the new password and/or detecting a failed web crawler attempt to create the new password.

In one embodiment, maintaining the database that stores the password criteria may include determining that the password provided for use in the website was rejected and/or updating the password criteria for the website based on determining that the password provided for use in the website was rejected. In this embodiment, updating the password criteria for the website may include using a web crawler to automatically detect changes to the password criteria and/or deducing, based on the rejected password, at least one changed password criterion for the website.

In some examples, using the set of password complexity rules to automatically generate the password for the website may include presenting a list of password preferences to the user that complies with the password criteria for the website. Additionally or alternatively, using the set of password complexity rules to automatically generate the password may include receiving, from the user, a selection of one or more password preferences. Furthermore, these examples may include creating the password based on the selection of one or more password preferences.

In one embodiment, a system for implementing the above-described method may include (1) a maintenance module, stored in memory, that maintains a database that stores password criteria for a plurality of websites, (2) an access module, stored in memory, that determines that a user is accessing a website that requests creation of a password, (3) a determination module, stored in memory, that determines a set of password complexity rules for the website by querying the database that stores the password criteria, (4) a generation module, stored in memory, that uses the set of password complexity rules to automatically generate the password for the website such that the password complies with the password criteria for the website, and (5) a provision module, stored in memory, that provides the password for use in the website that requested creation of the password. In addition, the system may include at least one processor that executes the maintenance module, the access module, the determination module, the generation module, and the provision module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain a database that stores password criteria for a plurality of websites, (2) determine that a user is accessing a website that requests creation of a password, (3) determine a set of password complexity rules for the website by querying the database that stores the password criteria, (4) use the set of password complexity rules to automatically generate the password for the website such that the password complies with the password criteria for the website, and (5) provide the password for use in the website that requested creation of the password.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
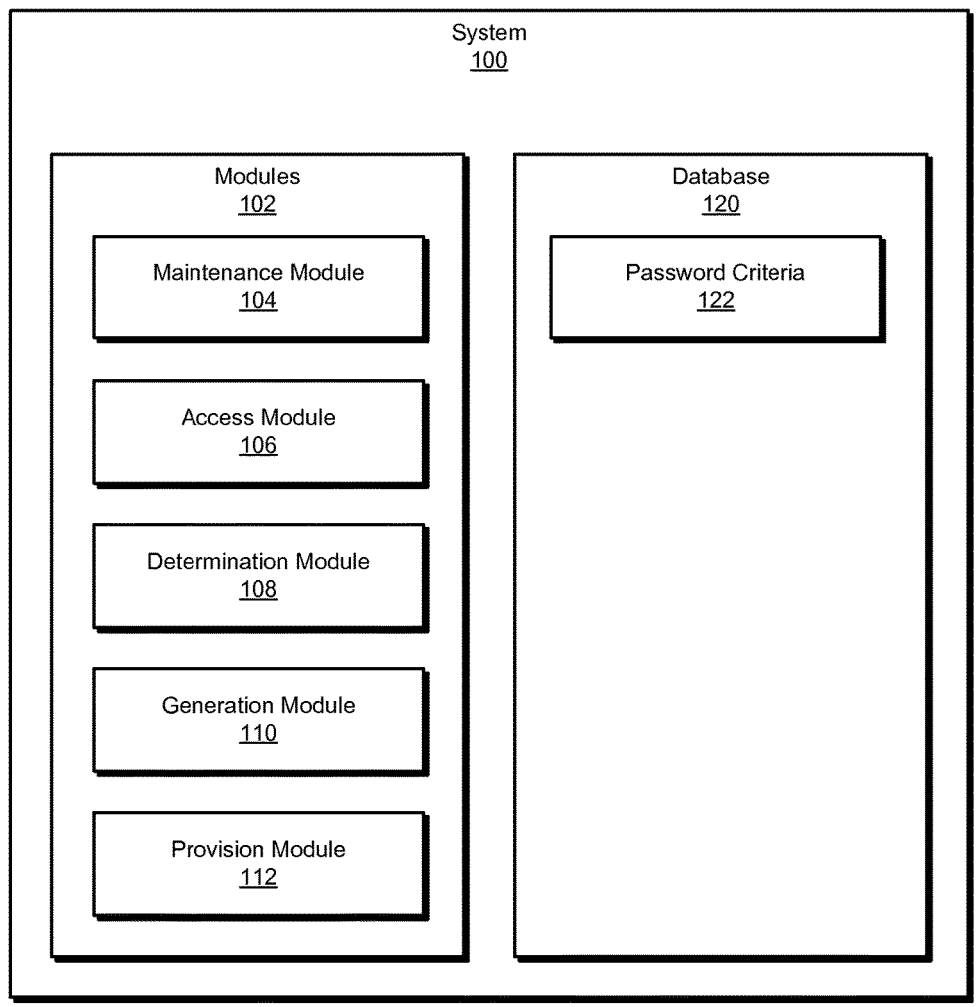
FIG. 1 is a block diagram of an exemplary system for automatically generating passwords that comply with password restrictions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically generating passwords that comply with password restrictions. As will be explained in greater detail below, by maintaining a database of password criteria, the disclosed systems and methods may ensure password managers generate passwords that comply with current password restrictions for different websites. For example, by using a web crawler to detect password criteria, the disclosed systems and methods may automatically create and update the database of password criteria with up-to-date password rules. Moreover, the disclosed systems and methods may then present users and/or websites with passwords that comply with a website's password criteria.

Figure 2:
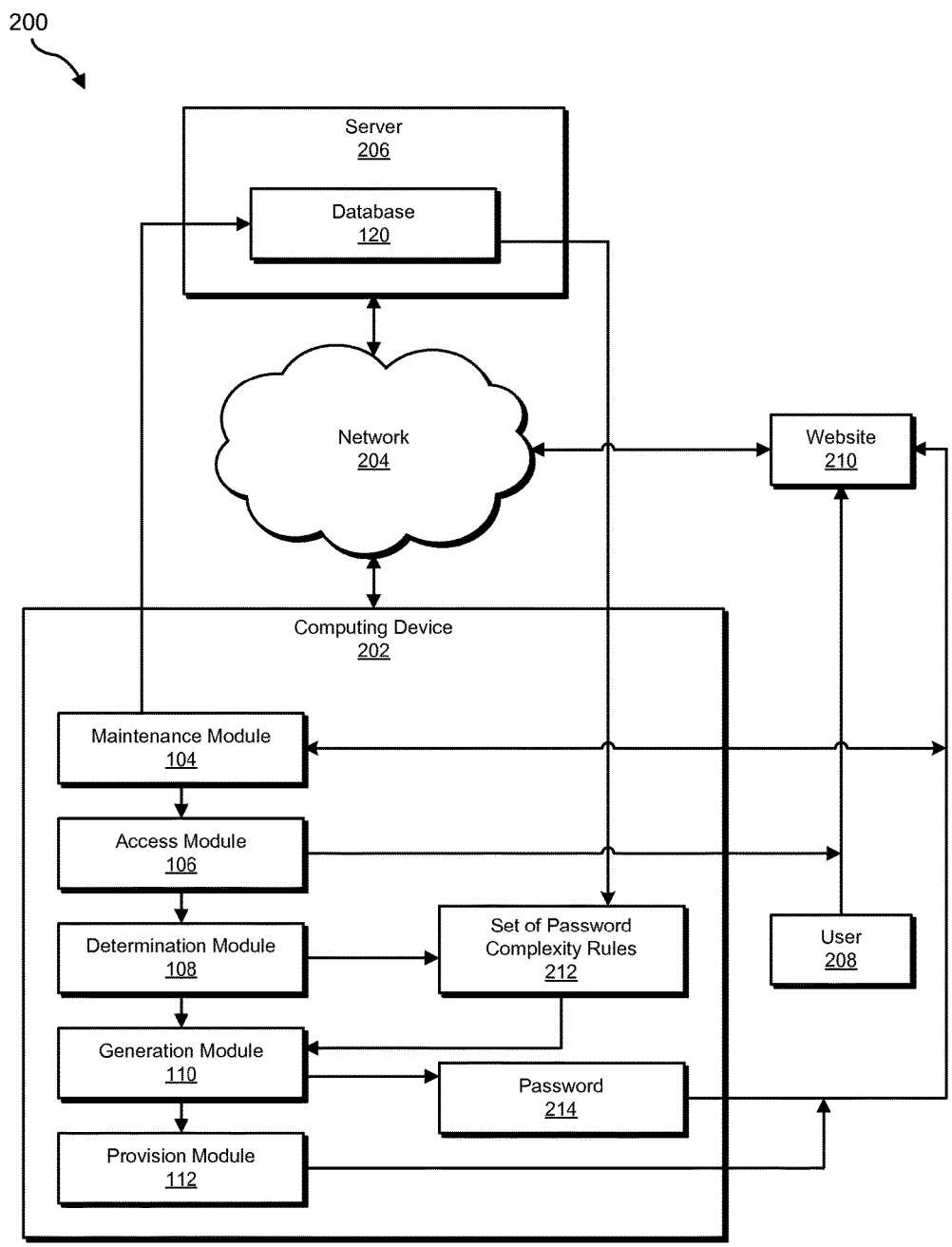
FIG. 2 is a block diagram of an additional exemplary system for automatically generating passwords that comply with password restrictions.

The following will provide, with reference to FIGS. 1 and 2, detailed descriptions of exemplary systems for automatically generating passwords that comply with password restrictions. Detailed descriptions of corresponding computer-implemented methods will also be provided in connection with FIG. 3. In addition, detailed descriptions of an exemplary web crawler that automatically detects exemplary password criteria will be provided in connection with FIG. 4. Furthermore, detailed descriptions of exemplary passwords generated based on exemplary selections of password preferences by a user will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for automatically generating passwords that comply with password restrictions. As illustrated in this figure, exemplary system 100 may include one or more modules 102 for performing one or more tasks. For example, and as will be explained in greater detail below, exemplary system 100 may also include a maintenance module 104 that may maintain a database that stores password criteria for a plurality of websites. The term "password criterion," as used herein, generally refers to a requirement or limitation imposed on the creation of a password. Examples of password criteria may include, without limitation, password length, the use of upper- and/or lower-case letters, types of characters that must be included, types of characters that must be excluded, exclusion of names or usernames, or any other form of password requirements or limitations.

Exemplary system 100 may additionally include an access module 106 that may determine that a user is accessing a website that requests creation of a password. Exemplary system 100 may also include a determination module 108 that may determine a set of password complexity rules for the website by querying the database that stores the password criteria. Furthermore, exemplary system 100 may include a generation module 110 that may use the set of password complexity rules to automatically generate the password for the website such that the password complies with the password criteria for the website. Finally, exemplary system 100 may include a provision module 112 that may provide the password for use in the website that requested creation of the password. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store password criteria 122, which may detail password requirements for a plurality of websites.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to ensure passwords follow website rules for password creation. For example, and as will be described in greater detail below, maintenance module 104 may maintain a database 120 that stores password criteria 122 for a plurality of websites. Access module 106 may determine that a user 208 is accessing a website 210 that requests creation of a password 214. Determination module 108 may then determine a set of password complexity rules 212 for website 210 by querying database 120 that stores password criteria 122. Additionally, generation module 110 may use set of password complexity rules 212 to automatically generate password 214 for website 210 such that password 214 complies with password criteria 122 for website 210. Finally, provision module 112 may provide password 214 for use in website 210.

The term "password complexity rule," as used herein, generally refers to a logical computing rule or guideline outlining limitations for a password. In some examples, a password complexity rule may be determined through a database query. In other examples, a password complexity rule may be constructed from a logical combination of other password complexity rules.

In the example of FIG. 2, and as will be explained in greater detail below, computing device 202 may maintain database 120 on server 206 via network 204. Database 120 may represent a cloud-based service accessible via network 204. Computing device 202 may then detect an attempt by user 208 to access website 210 via network 204 and determine that website 210 requests creation of a password. Next, computing device 202 may query database 120 to obtain set of password complexity rules 212 that apply to website 210. After obtaining set of password complexity rules 212, computing device 202 may generate password 214 to comply with password criteria 122 for website 210. Computing device 202 may then provide password 214 to user 208 for use in website 210. Additionally or alternatively, computing device 202 may update database 120 based on a rejection of password 214 by website 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or analyzing website password criteria. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
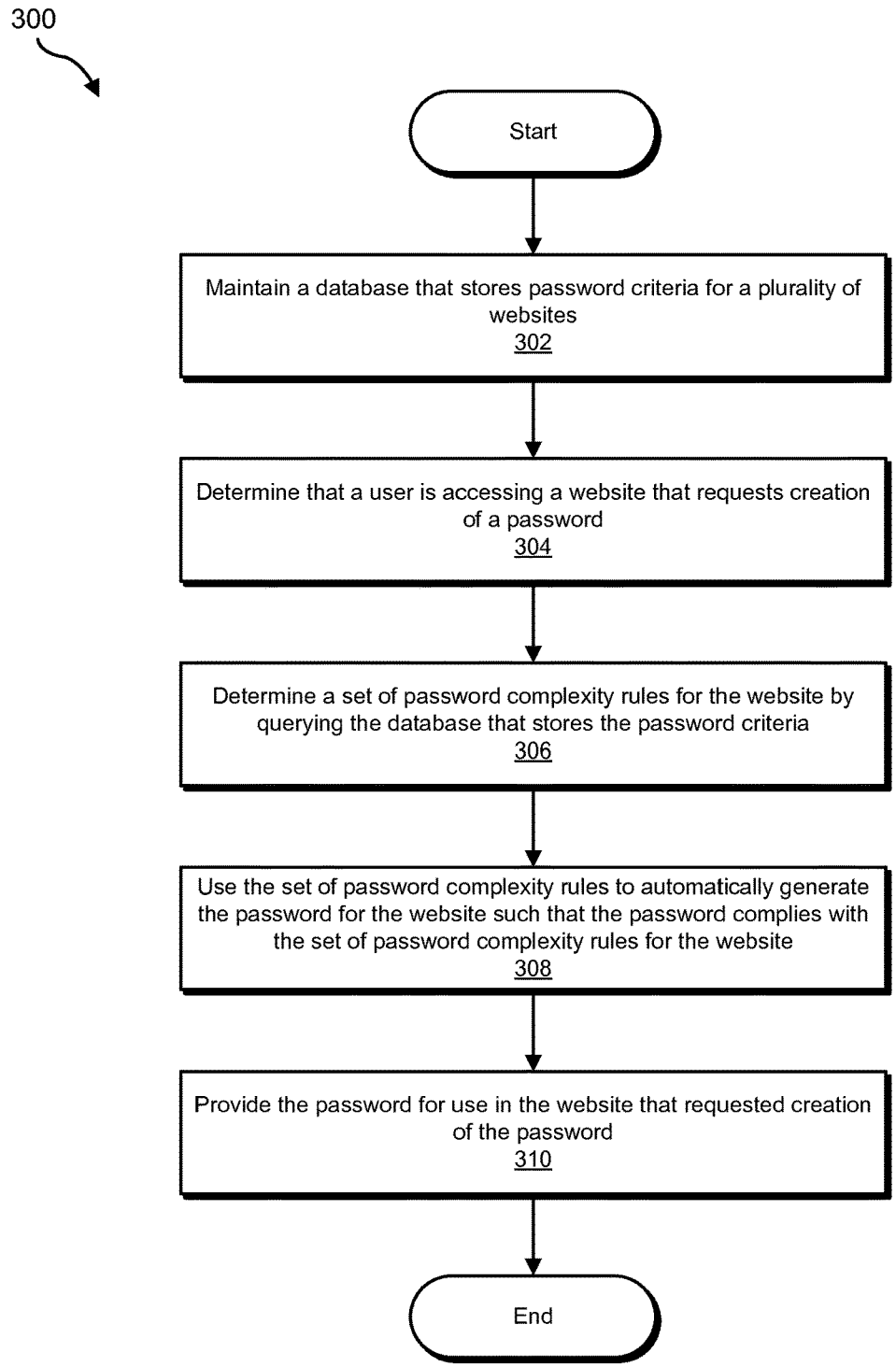
FIG. 3 is a flow diagram of an exemplary method for automatically generating passwords that comply with password restrictions.

FIG. 3 is a flow diagram of an exemplary computer-implemented method 300 for automatically generating passwords that comply with password restrictions. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may maintain a database that stores password criteria for a plurality of websites. For example, maintenance module 104 may, as part of computing device 202 in FIG. 2, maintain database 120 that stores password criteria 122 for a plurality of websites.

Maintenance database 120 may store various types of rules and requirements for password criteria 122. For example, password criteria 122 may include broad requirements or no specific requirements for password 214. Alternatively, password criteria 122 may include more complex password requirements (e.g., requirements that involve any combination of rules that require particular characters or character strings or exclude particular characters or character strings). For example, password criteria 122 may exclude punctuation while requiring at least one lower-case letter, at least one upper-case letter, and at least one number. As another example, password criteria 122 may exclude a character string that matches a user's username while requiring at least one special character. As a third example, password criteria 122 may disallow character strings that form words found in a dictionary and/or leetspeak (i.e., alternate representations of words that replace one or more letters with numbers or characters).

Maintenance module 104 may maintain database 120 in a variety of ways. In some examples, maintenance module 104 may maintain database 120 by using a web crawler to automatically detect password criteria for each website in the plurality of websites. The term "web crawler," as used herein, generally refers to an automated application that browses content on the Internet. Notably, a web crawler may be designed to validate and collect information on websites.

Figure 4:
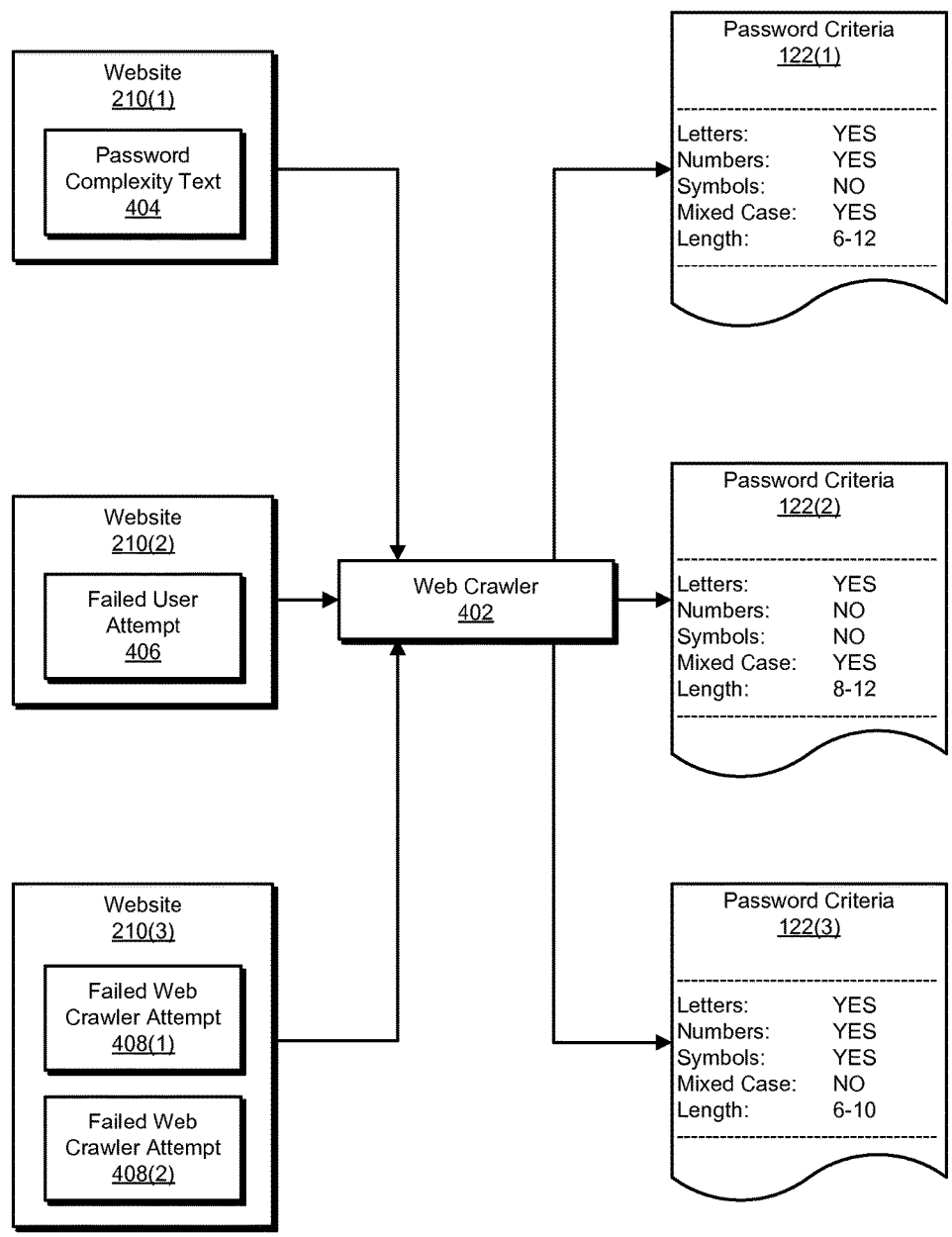
FIG. 4 is an illustration of an exemplary web crawler that automatically detects exemplary password criteria.

In one embodiment, as shown in FIG. 4, a web crawler 402 may detect password complexity text 404 on a website

210(1). In this embodiment, web crawler 402 may then parse password complexity text 404 to transform password complexity text 404 into password criteria 122(1) for website 210(1). For example, website 210(1) may have password complexity text 404 that states password 214 "must include letters and numbers." Web crawler 402 may parse the statement into password criteria 122(1) such that the category "Letters" and the category "Numbers" are allowed (e.g., "YES"). In some examples, web crawler 402 may utilize techniques such as natural language processing (NLP) and/or a keyword search to parse password complexity text 404.

In another embodiment, web crawler 402 may automatically detect password criteria by identifying a failed attempt to create a new password and/or deducing at least one password criterion based on the failed attempt. In one example, web crawler 402 may deduce password criteria 122(2) based on detecting a failed user attempt 406 to create a new password for a website 210(2). For example, failed user attempt 406 may include a password with both letters and numbers, and web crawler 402 may deduce that the category "Numbers" is not allowed (e.g., "NO"). In this example, web crawler 402 may additionally monitor all failed user attempts to create new passwords for website 210(2) and deduce password criteria 122(2) based on a combined analysis of the failed user attempts.

In another example, web crawler 402 may deduce password criteria based on detecting a failed web crawler attempt to create a new password. As shown in the example of FIG. 4, web crawler 402 may deduce password criteria 122(3) based on detecting a failed web crawler attempt 408(1) and a failed web crawler attempt 408(2) to create new passwords for a website 210(3). In this example, web crawler 402 may automatically attempt to create multiple passwords with varying complexity for website 210(3) in order to deduce password criteria 122(3). For example, web crawler 402 may create a password of 6 characters with mixed case letters, numbers, and symbols for failed web crawler attempt 408(1) and a password of 11 characters with non-mixed case letters, numbers and symbols for failed web crawler attempt 408(2). In this example, web crawler 402 may then deduce password criteria 122(3) that allows passwords of 6 to 10 characters using letters, numbers, and symbols but not mixed case letters.

In some embodiments, maintenance module 104 may maintain database 120 by determining that password 214 provided for use in website 210 was rejected. In these embodiments, maintenance module 104 may then update password criteria 122 for website 210 based on determining that password 214 was rejected. In one example, updating password criteria 122 for website 210 may further include using a web crawler to automatically detect changes to password criteria 122. In this example, the web crawler used to automatically detect changes to password criteria 122 may be web crawler 402 originally used to automatically detect password criteria 122. Additionally or alternatively, updating password criteria 122 may further include deducing, based on rejected password 214, at least one changed password criterion for website 210. In one embodiment, maintenance module 104 may regularly update password criteria 122 on a fixed schedule. In another embodiment, updates of password criteria 122 may be triggered by a failed attempt to create a new password.

Although the above examples detail automated maintenance of database 120, password criteria 122 may be manually updated by a person. For example, user 208 may update database 120 via network 204. In another example, user 208 may trigger an update to database 120 by attempting to create a new password. Additionally, database 120 may be maintained by an administrator of server 206 and/or another user via network 204.

Returning to FIG. 3, at step 304, one or more of the systems described herein may determine that a user is accessing a website that requests creation of a password. For example, access module 106 may, as part of computing device 202 in FIG. 2, determine that user 208 is accessing website 210 that requests creation of password 214.

Access module 106 may determine that user 208 is accessing website 210 in a variety of ways. In one embodiment, access module 106 may monitor all attempts to access websites via network 204. In another embodiment, access module 106 may detect websites that exist within database 120 (e.g., websites known to require passwords). In this embodiment, access module 106 may exclusively monitor websites that exist within database 120. Additionally or alternatively, user 208 may indicate when website 210 requests creation of password 214. For example, access module 106 may provide user 208 with an option to notify access module 106 that website 210 is requesting creation of password 214.

Returning to FIG. 3, at step 306, one or more of the systems described herein may determine a set of password complexity rules for the website by querying the database that stores the password criteria. For example, determination module 108 may, as part of computing device 202 in FIG. 2, determine set of password complexity rules 212 for website 210 by querying database 120 that stores password criteria 122.

Determination module 108 may determine set of password complexity rules 212 in a variety of ways. In the example of FIG. 2, determination module 108 may query database 120 on server 206 via network 204. In this example, determination module 108 may then construct set of password complexity rules 212 from results of the query. In other examples, database 120 may contain set of password complexity rules 212 for website 210. In these examples, determination module 108 may directly obtain set of complexity rules 212 from database 120.

Returning to FIG. 3, at step 308, one or more of the systems described herein may use the set of password complexity rules to automatically generate the password for the website such that the password complies with the password criteria for the website. For example, generation module 110 may, as part of computing device 202 in FIG. 2, use set of password complexity rules 212 to automatically generate password 214 for website 210 such that password 214 complies with password criteria 122 for website 210.

Generation module 110 may automatically generate password 214 in a variety of ways. In some embodiments, generation module 110 may present a list of allowable password preferences to user 208 that complies with password criteria 122 for website 210. In these embodiments, generation module 110 may then receive, from user 208, a selection of one or more password preferences. Additionally, generation module 110 may create password 214 based on the selection of password preferences.

Figure 5:
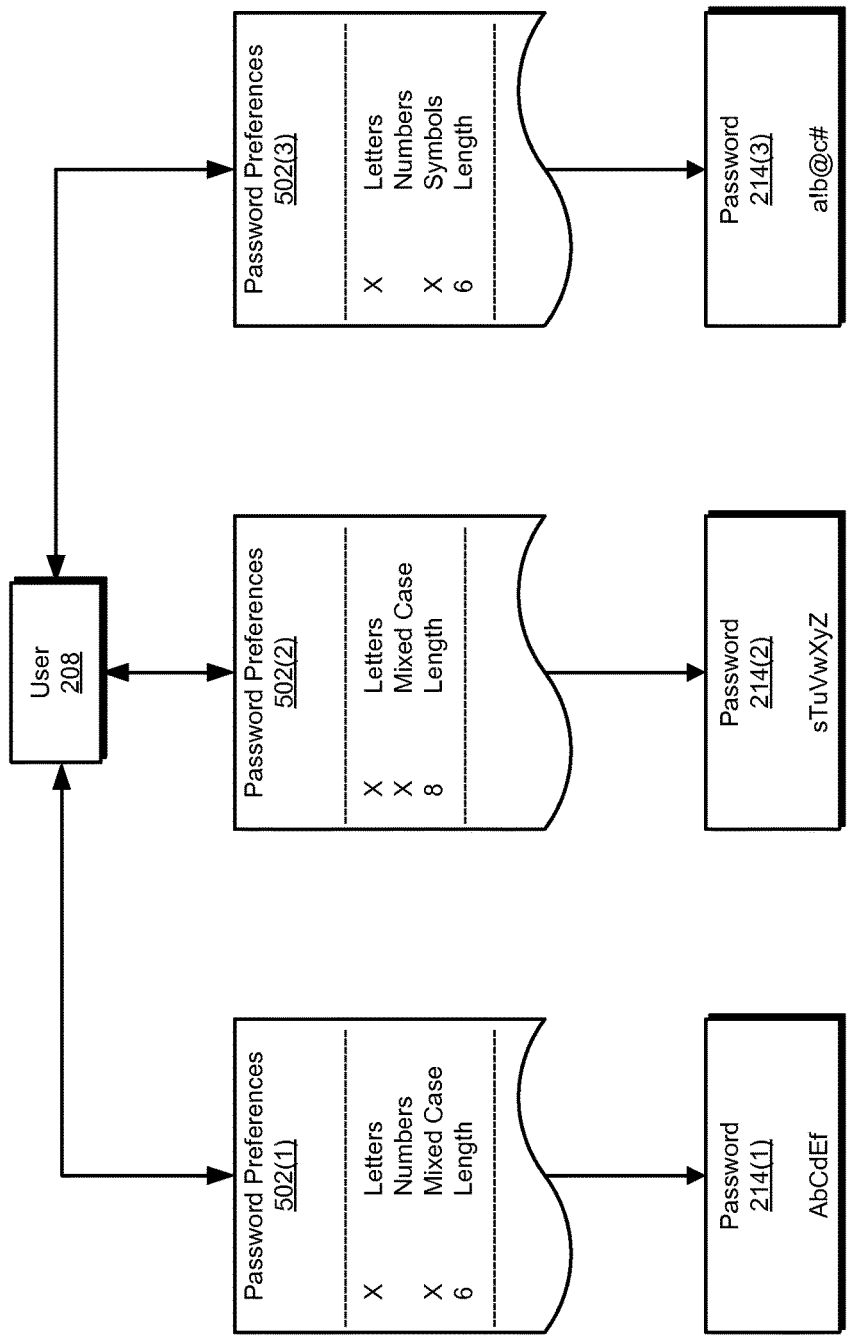
FIG. 5 is an illustration of exemplary passwords generated based on exemplary selections of password preferences by a user.

In the example of FIG. 5, user 208 may be presented with password preferences 502(1) that complies with password criteria 122(1) in FIG. 4, password preferences 502(2) that complies with password criteria 122(2) in FIG. 4, and password preferences 502(3) that complies with password criteria 122(3) in FIG. 4. As shown in FIG. 5, user 208 may prefer passwords of minimal length with mixed case letters and symbols and may select options from each list based on that preference (e.g., "Letters, Mixed Case, 6," "Letters, Mixed Case, 8," and "Letters, Symbols, 6"). Generation module 110 may then create a password 214(1) based on password preferences 502(1), a password 214(2) based on password preferences 502(2), and a password 214(3) based on password preferences 502(3). In other examples, user 208 may have different preferences for different websites, such as more complex passwords for financial websites, and select password preferences based on those differences. In additional embodiments, user 208 may select preferences to generate a single password or multiple passwords simultaneously.

Returning to FIG. 3, at step 310, one or more of the systems described herein may provide the password for use in the website that requested creation of the password. For example, provision module 112 may, as part of computing device 202 in FIG. 2, provide password 214 for use in website 210.

Provision module 112 may provide password 214 in a variety of ways. In some examples, provision module 112 may present user 208 with password 214 for approval before using password 214 in website 210. In other examples, provision module 112 may directly enter generated password 214 into website 210. Additionally or alternatively, provision module 112 may keep a record of generated passwords to be used for websites with similar password criteria. In this example, provision module 112 or user 208 may select a new password from a plurality of generated passwords that fit password criteria 122 for website 210.

As explained above in connection with method 300 in FIG. 3, the disclosed systems and methods may, by maintaining a database of website password requirements, automatically generate acceptable passwords for these websites. Specifically, by deploying a web crawler to detect password criteria on the websites, the disclosed systems and methods may automatically populate and update the database with new password requirements. For example, by detecting text related to password creation and subsequently using methods like NLP to create password rules based on that text, the disclosed systems and methods may generate passwords that comply with the rules stated on the websites. On websites where password rules are not readily available, the web crawler can alternatively deduce the rules based on attempts to create accounts with various passwords. In addition, the disclosed systems and methods may learn new password rules based on user activity and failed attempts to create passwords.

As detailed above, by narrowing down a list of password preferences that comply with website password criteria, the disclosed systems and methods may allow users to select options that would generate acceptable new passwords. Thus, the systems and methods described herein may provide more timely and nuanced control over password creation than traditional password managers. In addition, by updating the database with new password rules based on password creation failures, the disclosed systems and methods may dynamically provide new options and passwords to users.

Figure 6:
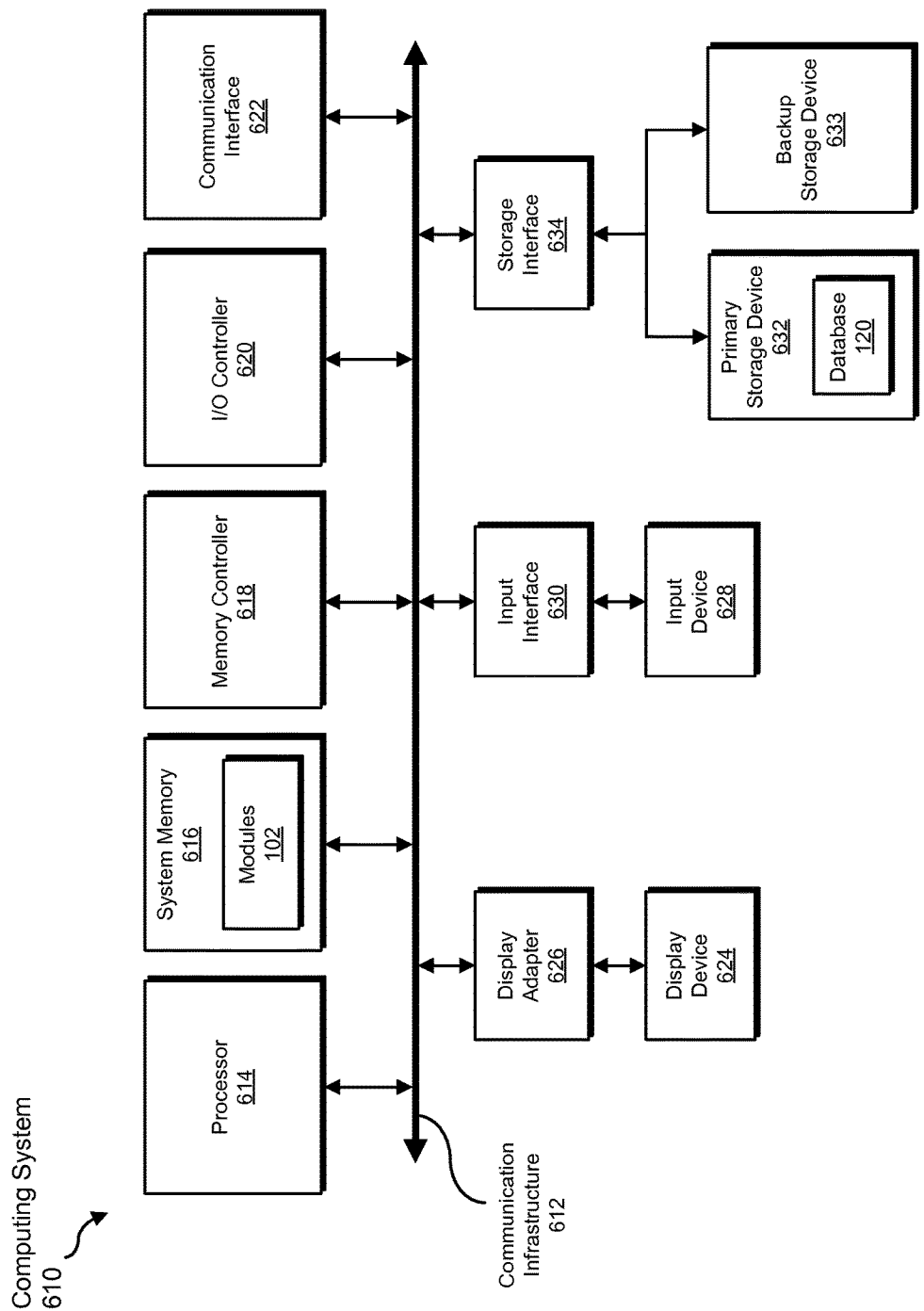
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
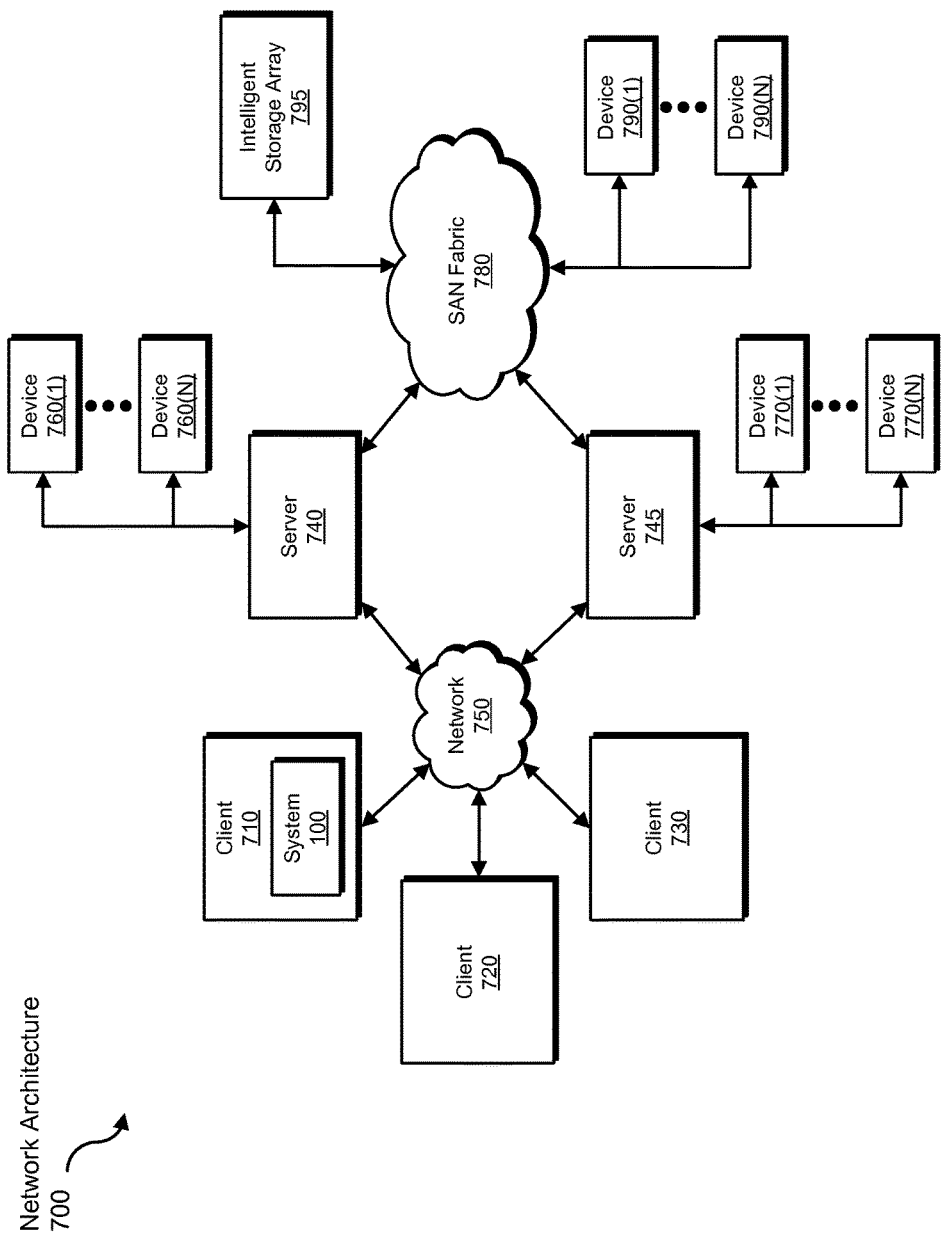
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automatically generating passwords that comply with password restrictions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive password criteria to be transformed, transform the password criteria, output a result of the transformation to a storage or output device, use the result of the transformation to generate a password that complies with the password criteria, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically generating passwords that comply with password restrictions, at least a portion of the method being performed by a computing device comprising at least one processor, the method comprising:
   maintaining, by the computing device, a database that stores current password-creation criteria for a plurality of websites by:
      using a web crawler to automatically detect the current password-creation criteria for each website in the plurality of websites; and
      for websites where the current password-creation criteria are not readily available, deducing the current password-creation criteria based on at least one failed attempt to create a new password by:
         identifying, by the computing device, the at least one failed attempt to create the new password on at least one website in the plurality of websites; and deducing, based on the at least one failed attempt to create the new password, at least one current password-creation criterion for the at least one website;

determining that a user is accessing a website that requests creation of a password;

automatically determining a set of password complexity rules for the website by querying the database that stores the current password-creation criteria;

using the set of password complexity rules to automatically generate the password for the website to ensure the password complies with the current password-creation criteria for the website; and providing the password for use, by the user, in the website that requested creation of the password.

2. The method of claim 1, wherein the web crawler validates and collects information on the plurality of websites.

3. The method of claim 1, wherein using the web crawler to automatically detect the current password-creation criteria for each website in the plurality of websites further comprises:

detecting password complexity text; and parsing the password complexity text to transform the password complexity text into the current password-creation criteria.

4. The method of claim 1, wherein identifying the at least one failed attempt to create the new password further comprises at least one of:

detecting a failed user attempt to create the new password; and detecting a failed web crawler attempt to create the new password.

5. The method of claim 1, wherein maintaining the database that stores the current password-creation criteria further comprises:

determining that the password provided for use in the website was rejected; and updating the current password-creation criteria for the website based on determining that the password provided for use in the website was rejected.

6. The method of claim 5, wherein updating the current password-creation criteria for the website further comprises at least one of:

using a web crawler to automatically detect changes to the current password-creation criteria; and deducing, based on the rejected password, at least one changed password-creation criterion for the website.

7. The method of claim 1, wherein using the set of password complexity rules to automatically generate the password for the website further comprises:

presenting a list of password preferences to the user that complies with the current password-creation criteria for the website;

receiving, from the user, a selection of one or more password preferences; and creating the password based on the selection of one or more password preferences.

8. A system for automatically generating passwords that comply with password restrictions, the system comprising:

a memory configured to store computer-readable instructions;

a maintenance module, stored in the memory, that maintains, by a computing device, a database that stores current password-creation criteria for a plurality of websites by:

using a web crawler to automatically detect the current password-creation criteria for each website in the plurality of websites; and for websites where the current password-creation criteria are not readily available, deducing the current password-creation criteria based on at least one failed attempt to create a new password by:

identifying, by the computing device, the at least one failed attempt to create the new password on at least one website in the plurality of websites; and deducing, based on the at least one failed attempt to create the new password, at least one current password-creation criterion for the at least one website;

an access module, stored in the memory, that determines that a user is accessing a website that requests creation of a password;

a determination module, stored in the memory, that automatically determines a set of password complexity rules for the website by querying the database that stores the current password-creation criteria;

a generation module, stored in the memory, that uses the set of password complexity rules to automatically generate the password for the website to ensure the password complies with the current password-creation criteria for the website;

a provision module, stored in the memory, that provides the password for use, by the user, in the website that requested creation of the password; and at least one processor that executes the maintenance module, the access module, the determination module, the generation module, and the provision module.

9. The system of claim 8, wherein the web crawler validates and collects information on the plurality of websites.

10. The system of claim 8, wherein using the web crawler to automatically detect the current password-creation criteria for each website in the plurality of websites further comprises:

detecting password complexity text; and parsing the password complexity text to transform the password complexity text into the current password-creation criteria.

11. The system of claim 8, wherein identifying the at least one failed attempt to create the new password further comprises at least one of:

detecting a failed user attempt to create the new password; and detecting a failed web crawler attempt to create the new password.

12. The system of claim 8, wherein the maintenance module maintains the database that stores the current password-creation criteria by:

determining that the password provided for use in the website was rejected; and updating the current password-creation criteria for the website based on determining that the password provided for use in the website was rejected.

13. The system of claim 12, wherein updating the current password-creation criteria for the website further comprises at least one of:

using a web crawler to automatically detect changes to the current password-creation criteria; and deducing, based on the rejected password, at least one changed password-creation criterion for the website.

14. The system of claim 8, wherein the generation module uses the set of password complexity rules to automatically generate the password for the website by:
- presenting a list of password preferences to the user that complies with the current password-creation criteria for the website;
- receiving, from the user, a selection of one or more password preferences; and
- creating the password based on the selection of one or more password preferences.

15. A non-transitory computer-readable medium comprising one or more computer-readable instructions that, when executed by at least one processor of a computing device, cause the computing device to:
- maintain, by the computing device, a database that stores current password-creation criteria for a plurality of websites by:
  - using a web crawler to automatically detect the current password-creation criteria for each website in the plurality of websites; and
  - for websites where the current password-creation criteria are not readily available, deducing the current password-creation criteria based on at least one failed attempt to create a new password by:
    - identifying, by the computing device, the at least one failed attempt to create the new password on at least one website in the plurality of websites; and
    - deducing, based on the at least one failed attempt to create the new password, at least one current password-creation criterion for the at least one website;
- determine that a user is accessing a website that requests creation of a password;
- automatically determine a set of password complexity rules for the website by querying the database that stores the current password-creation criteria;
- use the set of password complexity rules to automatically generate the password for the website to ensure the password complies with the current password-creation criteria for the website; and
- provide the password for use, by the user, in the website that requested creation of the password.

16. The non-transitory computer-readable medium of claim 15, wherein the web crawler validates and collects information on the plurality of websites.

17. The non-transitory computer-readable medium of claim 15, wherein the one or more computer-readable instructions cause the computing device to use the web crawler to automatically detect the current password-creation criteria for each website in the plurality of websites by:
- detecting password complexity text; and
- parsing the password complexity text to transform the password complexity text into the current password-creation criteria.

* * * * *